United States Patent [19]

Johnson et al.

[11] Patent Number: 5,169,590
[45] Date of Patent: Dec. 8, 1992

[54] RESIN MOLDING PROCESS UTILIZING A BLOW MOLDED CORE

[75] Inventors: Carl F. Johnson, New Boston; Douglas G. Peterson, Rochester Hills, both of Mich.

[73] Assignee: Automotive Composites Consortium, Troy, Mich.

[21] Appl. No.: 616,881

[22] Filed: Nov. 21, 1990

[51] Int. Cl.⁵ .................. B29C 49/20; B29C 45/14
[52] U.S. Cl. .................................. 264/506; 264/257;
264/258; 264/279; 264/279.1; 264/328.4;
264/328.6; 264/512; 264/513
[58] Field of Search ............... 264/506, 510, 512, 513,
264/250, 257, 314, 317, 295, 240, 279, 279.1,
328.4, 328.6, 258; 425/112

[56] References Cited

U.S. PATENT DOCUMENTS

| | | | |
|---|---|---|---|
| 4,317,964 | 2/1982 | Ferrary | 264/513 |
| 4,470,785 | 9/1984 | Koorevaar | 264/328.6 |
| 4,762,740 | 8/1988 | Johnson et al. | 264/263 |
| 5,000,990 | 3/1991 | Freeman | 264/258 |
| 5,034,173 | 7/1991 | Ahman | 264/257 |

FOREIGN PATENT DOCUMENTS

| | | | |
|---|---|---|---|
| 202671 | 1/1955 | Australia | 264/257 |
| 232207 | 8/1987 | European Pat. Off. | 264/513 |
| 2730667 | 1/1979 | Fed. Rep. of Germany | 264/512 |
| 54-031470 | 3/1979 | Japan | 264/506 |
| 56-058833 | 5/1981 | Japan | 264/295 |
| 59-142118 | 8/1984 | Japan | 264/512 |
| 61-202827 | 9/1986 | Japan | 264/317 |
| 1218809 | 9/1989 | Japan | 264/314 |

Primary Examiner—Jan H. Silbaugh
Assistant Examiner—Catherine Timm
Attorney, Agent, or Firm—Reising, Ethington, Barnard, Perry & Milton

[57] ABSTRACT

Automobile panels and body parts are manufactured using a core element (10, 10'). The core element (10, 10') may be blow molded into a hollow core member for use in liquid resin molding. The core element (10') may include molded channels (26) extending longitudinally therealong to facilitate the flow of liquid about the core element (10') during the molding process. The core element (10') may also or alternatively include a corrugated portion (32) to allow bending of the rigid core (10') during placement within the mold (34). After placement in a mold (34), a liquid molding process is initiated to form the automobile panels and body parts.

6 Claims, 3 Drawing Sheets

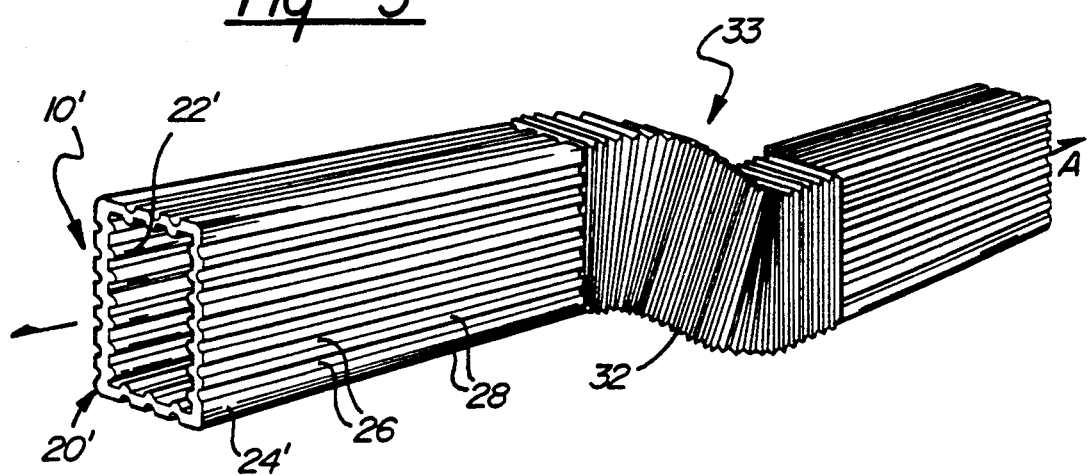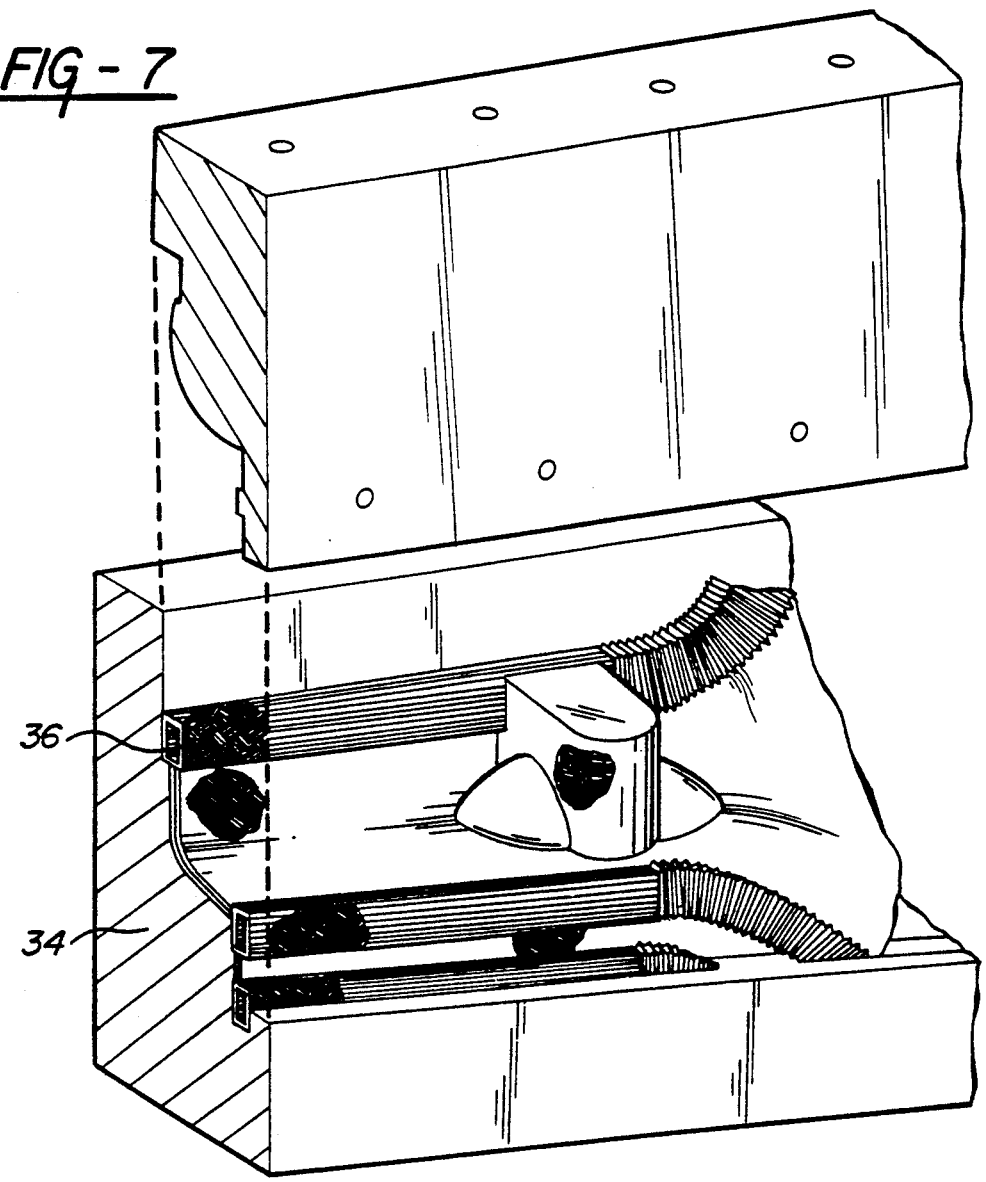

RESIN MOLDING PROCESS UTILIZING A BLOW MOLDED CORE

TECHNICAL FIELD

The invention relates to producing fiber reinforced organic polymeric core elements for automotive panels and body parts.

BACKGROUND OF THE INVENTION

Core elements for automotive body parts have generally been manufactured of metal tubing or solid foam thermoplastic cores. With the desire to reduce the weight of automobiles, It is preferable to produce and process and core elements which are light weight.

One prior art process includes inflatable bladder about which organic polymeric materials may be molded. The bladder is either deflated and pulled out or left for waste after molding. The bladder is generally resilient and flexible, such as a balloon. Therefore, a specific shape can not be maintained by the bladder during the molding step.

Blow molding articles is also commonly known. In general, a parison is formed by the injection of a plasticized material around a mandrel. While the material is still molten and on the mandrel, it is transferred to a blowing mold where air is used to inflate it forming the article.

SUMMARY OF THE INVENTION AND ADVANTAGES

The invention is a process for molding an article comprising the steps of blow molding a core element with thermoplastic resin into a predetermined form, curing the core element to a rigid core element, placing the rigid core element in a mold, and liquid molding about the core element producing a structural article.

The invention also includes a molded article for use in the liquid molding process. The article comprises a core member having an external surface and is characterized by including channels established on the external surface for facilitating the flow of liquid during the molding process.

The invention also includes a hollow core member of thermoplastic resin having a circumferential shell and a bend portion. The core member is characterized by including circumferential corrugations in the bend portion of the hollow core member for shaping of the hollow core member prior to liquid molding thereof.

DESCRIPTION OF THE DRAWINGS

Other advantages of the present invention will be readily appreciated as the same becomes better understood by reference to the following detailed description when considered in connection with the accompanying drawings wherein:

FIG. 5 is a perspective view of a core element utilizing the two additional features;

FIG. 7 is a perspective view of the core elements and a mold.

DESCRIPTION OF THE PREFERRED EMBODIMENT

Figure 1:
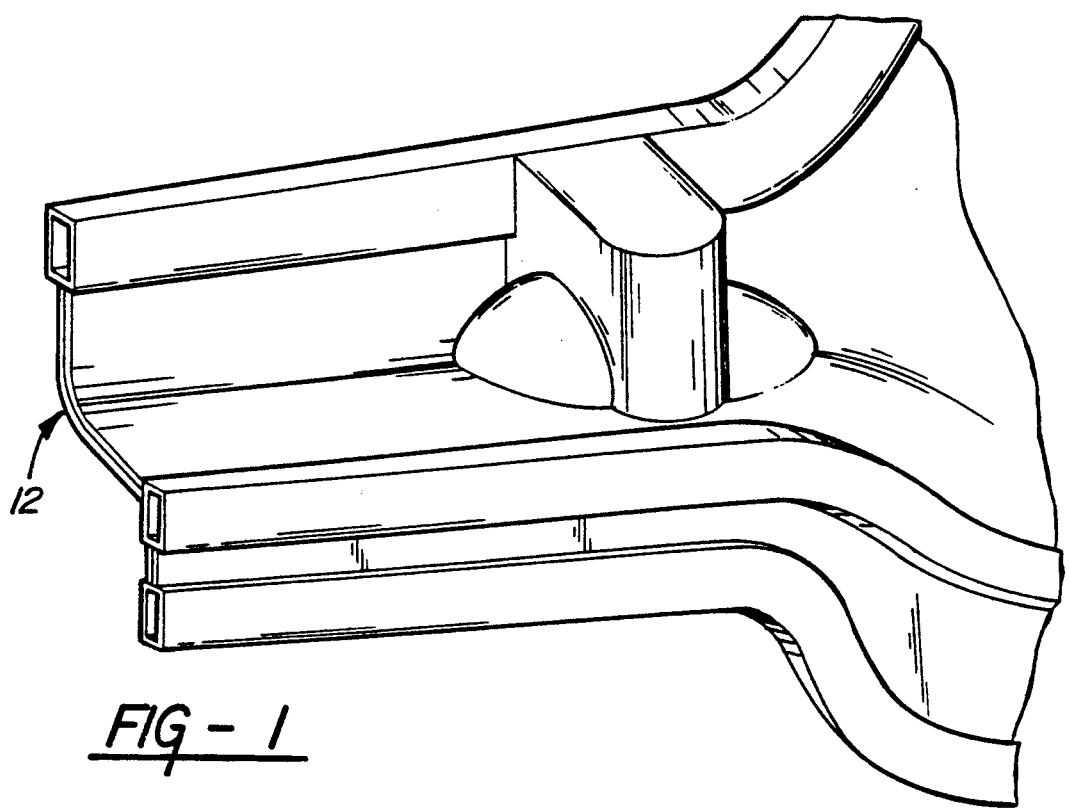
FIG. 1 is a perspective view of a an automotive body part formed by the subject invention.

In molding processes, a core element 10, 10' is utilized to establish the general shape of a finished or structural article 12 used as an automobile panel or other automobile body part. By using such a core member 10, 10,, weight constraints which are associated in the auto industry may be realized.

Copending application Ser. No. 616,412, filed concurrently herewith, discloses one type of molding process used to manufacture automobile body parts. The process for molding an article generally includes the steps of placing a core element or elements within a mold, and liquid molding about the core element or elements for producing a structural article. The liquid molding processes may include any one of resin transfer molding (RTM), reaction injection molding (RIM) or structural reaction injection molding (SRIM). These processes are commonly known in the art.

In the preferred embodiment, the core element 10, 10' is manufactured from a standard blow molding process. As commonly known in blow molding art, a parison or tube 14 is formed by the injection of a plasticized material around a hollow mandrel 16, 16'. While the material 14 is still molten and still on the mandrel 16, 16', it is transferred into the blowing mold 18, 18' where air is used to inflate it. In the subject invention, an unreinforced or glass reinforced thermoplastic resin with sufficient elevated temperature stability is blow molded into the shape of the a core element 10, 10' which will be utilized in the molding process. The blow molded core element 10, 10' is then cured which establishes a substantially rigid or stiff element 10, 10'. This core element 10, 10' may then be used in the liquid molding processes described above.

Figure 2:
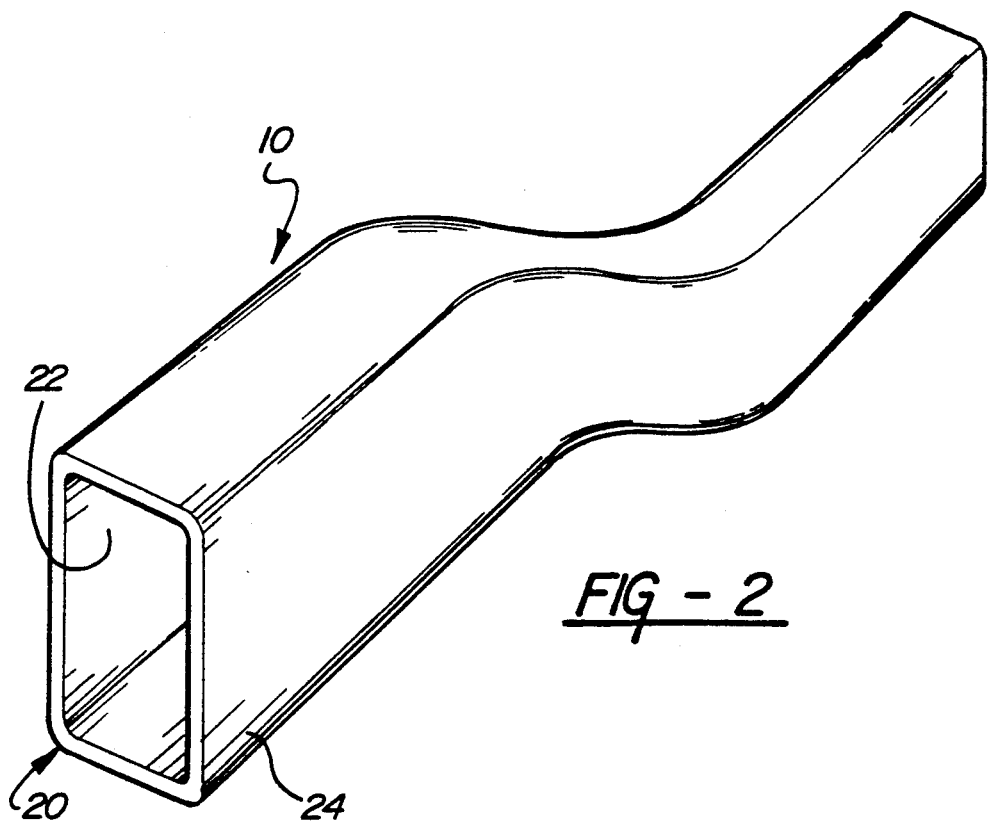
FIG. 2 is a perspective view of a blow molded core element.
Figure 3:
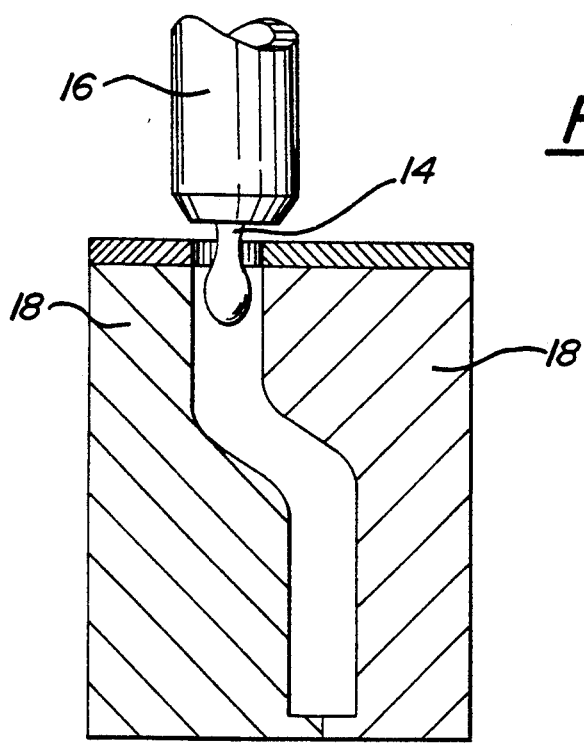
FIG. 3 illustrates the first step of forming the parison in the blow molding process.
Figure 4:
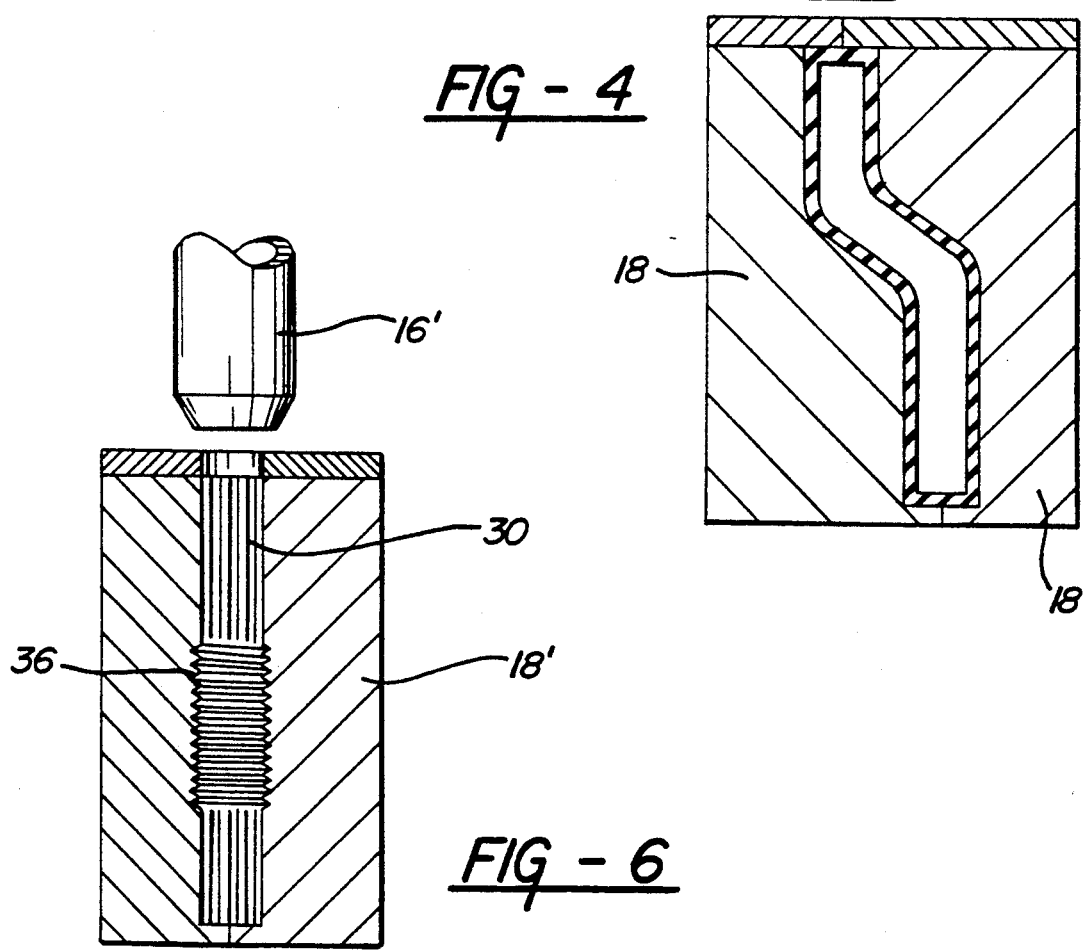
FIG. 4 illustrates the final step of inflating the parison to form the core element.

The core element 10, 10' includes a hollow core member 20, 20, having internal 22, 22' and external 24, 24' surfaces. The core element 10 may be blow molded having a smooth exterior surface 24 as illustrated in FIG. 2. Such a core element 10 will be blow molded in a smooth surfaced and shaped mold 18, as illustrated in FIGS. 3 and 4.

Figure 6:
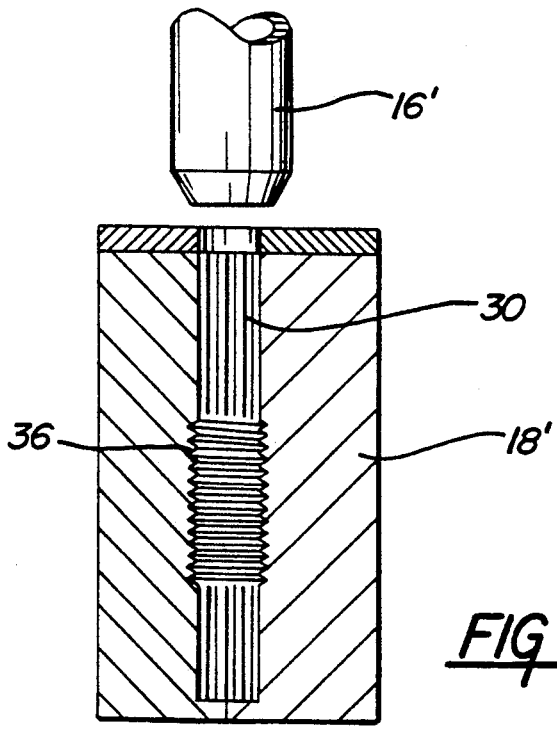
FIG. 6 is a cross-sectional view of the blowing mold used to form the core element of FIG. 5.

Alternatively, the core element 10' may be blow molded to contain additional optional features as illustrated in FIG. 5. A first feature includes channels 26 established on the external surface 18' for facilitating flow of liquid during the liquid molding process and the draining of the superfluous liquid thereafter. The core element 10' generally extends longitudinally along a longitudinal axis A for a predetermined length wherein the channels 26 extend for the predetermined length. The channels 26 are comprised of molded threads 28 extending from the external surface 18' which provide the fluid channels 26' therebetween. The blowing mold 18' will contain complementary threads to create the channels 26 on the exterior surface 18 of the core element 10' as illustrated in FIG. 6.

A second feature of the core element 10' includes circumferential corrugations 32' on a portion thereof. The core element 10' includes the corrugations 32' to allow shaping of the hollow core member 20' prior to placement in a mold 34 for the liquid molding thereof. The corrugations 32 are located in a bend portion 33 of the core member 20'. Therefore, the predetermined shape or bend in the core element 10' need not be provided during the blowing process, as illustrated by the mold 18' in FIG. 6, but may be shaped during placement within the mold 34. This provides for a generic shaped core element 10' which may be used as a plurality of different articles to be formed. The blowing mold 18' will include corrugations or ribs 36 extending therefrom as illustrated in FIG. 6 which form the corrugations 32 on the core element 10'. The blow molded core element 10, 10' is thereafter placed in a mold 34 for the liquid molding process. The core element 10' having corrugations 20 is bent and shaped to fit the mold as illustrated in FIG. 7. It is to be understood that a core element 10' may use any combination of the features, i.e., only the channels 26, only the corrugations 32, or both features 26, 32.

After blow molding, the core element 10, 10' may be braided with fiberglass tows 36 for further structural reinforcement. Alternatively, other fibrous reinforcing material may be used in place of or in addition to the fiberglass, such as KEYLAR, carbon fiber, etc. If the core element 10' is placed in a mold 24 the liquid during the molding process will flow along the channels 26 to evenly and quickly coat the core element 10 wherein the excess may easily drained therealong.

The hollow core elements 10, 10' may be utilized in the process of the aforementioned copending application. As illustrated in FIG. 1, an automotive fiberglass body part, such as a front panel, comprising the consolidated form 12 is manufactured. In general, the consolidated form 12 is manufactured from a plurality of segments. A first segment 40 operates as an upper rail, a second segment 42 operates as a lower rail, a third segment 44 comprises an outer 46 and inner 47 shell which will interconnect the first segment 40 and the second segment 42, and a fourth segment 48 operates as a shock tower. The first segment 40, second segment 42, and fourth segment 48 are independently formed by shaped core elements 41, 43, 49 and thereafter independently fiber reinforcement. The core elements 41, 43, 49 may be blow molded as described above utilizing any of the described features. The core elements 41, 43, 49 are fiber reinforced with fiberglass 36. Thereafter, the segments 12, 14, 16, 22 are resin molded into the consolidated form 10. The third segment 44 comprises an outer 46 and inner 47 shell fabricated utilizing a continuous strand mat forming process of fiberglass or a directed fiber spray-up process. The outer 18 and inner 20 shells are formed of any shape, and in the preferred embodiment, shaped as longitudinally extending L-shaped member.

After each segment is fiber reinforced, all of the segments 40, 42, 44, 48 are placed and arranged in the mold 34. The mold 32 has an interior contour surface 52 complementing the desired shape of the consolidated form 12. The arranged segments 40, 42, 44, 48 complement the interior contour surface 52. Each of the segments 40, 42, 44, 48 are placed in mating relationship with the contour surface 52 in proper orientation therewith. As illustrated in FIG. 7, the third segment 44 is placed between and interconnecting the first segment 40 and the second segment 42. The fourth segment 48 is placed adjacent the three segments 40, 42, 44 for molding with each of the segments 40, 42, 44.

Thereafter, an upper platen 54 having a complementing contoured surface is closed against the mold 34 to provide a closed system having an openings 56 therein for receiving the liquid molding material. When the mold 34, 54 is closed, a resin transfer molding (RTM), reaction injection molding (RIM), or structural reaction injection molding (SRIM) process is executed, as commonly known in the art, to flow resin thereabout. Thereafter, the molded form 12 is cured. The mold 34, 54 is opened to provide the finished consolidated form 10, as illustrated in FIG. 7, which unifies the first segment 40 with the second segment 42 with the third segment 44 and the fourth segment 48.

It is to be understood that the described process may be applied to any application utilizing structural articles, in addition to the automotive application described herein.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A process for molding a structural article, the process including the steps of:
    molding a hollow core element (10, 10') with thermoplastic resin into a predetermined form,
    molding circumferential corrugations (32) on a bend portion (33) of the core element (10');
    curing the core element (10, 10') to a rigid core element;
    bending the rigid core element at the bend portion;
    placing the rigid core element (10; 10') in a mold (34); and
    liquid molding about the core element (34) producing the structural article.

2. A process as set forth in claim 1 further including bending the core element (10, 10') at the corrugations (32) to a desired form for placement in the mold (34).

3. A process as set forth in claim 1 further including braiding fiber-reinforced glass (36) about the rigid core element (10, 10').

4. A process as set forth in claim 1 wherein the step of molding the hollow core element comprises blow molding.

5. A process for molding a structural article, the process including the steps of:
    molding a hollow core element (10, 10') with thermoplastic resin into a predetermined form,
    molding a plurality of channels (26) on an external surface (24') of the core element (10') having threads (28),
    curing the core element (10, 10') to a rigid core element having channels about its surface,
    placing the rigid core element (10, 10') in a mold (34),
    liquid molding about the core element (34) allowing the liquid to flow through the channels about the surface, the channels facilitating the flow of liquid during the molding process so that the core element is evenly and quickly cooled and thereby producing the structural article.

6. A process as set forth in claim 5 wherein the step of molding the hollow core element comprises blow molding.

* * * * *